United States Patent
Pan et al.

(10) Patent No.: US 9,070,035 B2
(45) Date of Patent: Jun. 30, 2015

(54) DOCUMENT PROCESSING APPARATUS, DOCUMENT PROCESSING METHOD AND SCANNER

(71) Applicant: FUJITSU LIMITED, Kawasaki (JP)

(72) Inventors: Yifeng Pan, Beijing (CN); Jun Sun, Beijing (CN); Yuan He, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 13/904,477

(22) Filed: May 29, 2013

(65) Prior Publication Data

US 2013/0322757 A1 Dec. 5, 2013

(30) Foreign Application Priority Data

May 31, 2012 (CN) .......................... 2012 1 0177541

(51) Int. Cl.
*G06K 9/00* (2006.01)
*G06K 9/18* (2006.01)
*G06K 9/32* (2006.01)

(52) U.S. Cl.
CPC ............... *G06K 9/18* (2013.01); *G06K 9/3208* (2013.01); *G06K 9/00442* (2013.01)

(58) Field of Classification Search
USPC ......... 382/176, 177, 178, 179, 185, 186, 187, 382/188, 189, 198, 199, 200, 229, 230, 289, 382/290, 291, 292; 345/442, 443, 467, 468, 345/469.1, 470
See application file for complete search history.

(56) References Cited

U.S. PATENT DOCUMENTS

| | | | | |
|---|---|---|---|---|
| 5,812,697 | A * | 9/1998 | Sakai et al. | 382/186 |
| 5,889,884 | A * | 3/1999 | Hashimoto et al. | 382/168 |
| 6,064,769 | A * | 5/2000 | Nakao et al. | 382/224 |
| 6,266,441 | B1 * | 7/2001 | Hashimoto et al. | 382/170 |
| 6,993,205 | B1 | 1/2006 | Lorie et al. | |
| 7,031,553 | B2 * | 4/2006 | Myers et al. | 382/289 |
| 7,620,268 | B2 * | 11/2009 | Myers et al. | 382/289 |
| 2006/0210195 | A1 * | 9/2006 | Ohguro | 382/290 |
| 2008/0317341 | A1 | 12/2008 | Speigle et al. | |
| 2013/0002705 | A1 * | 1/2013 | Cornell | 345/617 |

OTHER PUBLICATIONS

Trier et al., "Evaluation of Binarization Methods for Document Images," Trier and Taxt: Evaluation of Binarization Methods, *IEEE* (1995) pp. 31-36.

(Continued)

*Primary Examiner* — Brian Le
(74) *Attorney, Agent, or Firm* — Staas & Halsey LLP (57) ABSTRACT

The disclosure provides a document processing apparatus, method and a scanner. The document processing apparatus includes: a text line extraction unit extracting a text line from an input document; a language classification unit determining whether an OCR process is necessary for a language of the input document; an OCR unit determining, by performing the OCR process, an OCR confidence in the case that it is determined that the OCR process is necessary; a graphic feature recognition unit determining an graphic feature recognition confidence; and a determination unit determining a combination confidence based on at least one of the determined graphic feature recognition confidences and the determined OCR confidences, and determining an orientation of the input document based on the combination confidences. This technical solution can determine better an orientation of the document, and is especially applicable when the quality of the image of the document is deteriorated.

19 Claims, 6 Drawing Sheets

(56) References Cited

OTHER PUBLICATIONS

Shijian Lu et al., "Identification of Scripts and Orientations of Degraded Document Images," Institute for Infocomm Research, A*STAR, Singapore; Department of Computer Science, School of Computing, National University of Singapore, Singapore; Preprint submitted to Elsevier (Jan. 2008), pp. 1-20.

Ranjith Unnikrishnan et al., "Combined Script and Page Orientation Estimation using the Tesseract OCR engine," Google Inc., *MOCR* (Jul. 2009) pp. 1-7.

"Ensemble learning", *Wikipedia*, URL: http://en.wikipedia.org/wiki/Ensemble_learning, retrieved Aug. 12, 2014, 7 pages.

Extended European Search Report mailed Sep. 17, 2014 for corresponding European Patent Application No. 13168236.1, 10 pages.

\* cited by examiner

41 e doenças da fauna brava;

42 gente e preocupante, que 43 as iniciativas de conservação 44 lais de criação é um assunto 45 paisagens transfronteiriças,

DOCUMENT PROCESSING APPARATUS, DOCUMENT PROCESSING METHOD AND SCANNER

CROSS REFERENCE TO RELATED APPLICATIONS

This application claims the benefit of Chinese Application No. 201210177541.2, filed May 31, 2012, the disclosure of which is incorporated herein by reference.

TECHNICAL FIELD

The disclosure relates to a document processing apparatus, document processing method and scanner, and particularly to a document processing apparatus, document processing method and scanner for determining an orientation of an input document.

BACKGROUND

With increasing demands for digital libraries and electronic documents, a large number of documents having physical carriers (such as paper documents and film documents) need to be scanned and converted into electronic documents with a designated format by a document image processing system (DIPS). However, an important step of the document image processing system often requires to determine automatically directions of the document from the scanned document image (for example, four candidate directions: from left to right, from right to left, from bottom to top, and from top to bottom). And the performance of performing the determination process often influences the overall performance of the document image processing system.

There are mainly the following two types of existing determination methods. One type of determination method is a method based on an graphic feature, and the other is a method based on Optical Character Recognition (OCR).

SUMMARY

However, for determining an orientation of the document better, neither of the above methods can obtain a satisfactory determination effect especially when the quality of the document image obtained by scanning is poor.

Therefore, at least for addressing this issue, the inventor of the disclosure proposes a new method for determining an orientation of a document, that is, making determination by comprehensively utilizing graphic feature information and optical character recognition in consideration of the language of the document.

Specifically, the disclosure provides a document processing apparatus, comprising: a text line extraction unit, configured to extract at least one text line from an input document; a language classification unit, configured to determine, by performing an graphic feature recognition process, whether an OCR process is necessary for a language of the input document; an OCR unit, configured to determine, by performing the OCR process, an OCR confidence with respect to each candidate direction for each of at least some of the text lines, in the case that it is determined that the OCR process is necessary for the language of the input document; an graphic feature recognition unit, configured to determine, by performing the graphic feature recognition processing, an graphic feature recognition confidence with respect to each candidate direction for each of text lines; and a determination unit, configured to determine, based on at least one of the determined graphic feature recognition confidences and the determined OCR confidences, a combination confidence with respect to each candidate direction for each of the at least some of the text lines, and determine, based on the combination confidences, an orientation of the input document.

The disclosure further provides a scanner comprising the document processing apparatus for determining an orientation of the input document.

The disclosure further provides a document processing method, comprising: extracting at least one text line from an input document; determining, by performing an graphic feature recognition process, whether an OCR process is necessary for a language of the input document; determining, by performing the OCR process, an OCR confidence with respect to each candidate direction for each of at least some of the text lines, in the case that it is determined that the OCR process is necessary for the language of the input document; determining, by performing the graphic feature recognition processing, an graphic feature recognition confidence with respect to each candidate direction for each of text lines; and determining, based on at least one of the determined graphic feature recognition confidences and the determined OCR confidences, a combination confidence with respect to each candidate direction for each of the at least some of the text lines, and determining, based on the combination confidences, an orientation of the input document.

According to an embodiment of the disclosure, there is further provided a program for causing a computer device to execute the document processing method for determining an orientation of an input document.

According to an embodiment of the disclosure, there is further provided a corresponding computer readable storage medium, on which a program which can be executed by a computer apparatus is stored, and when the program is executed, the program enables a computer apparatus to execute the document processing method.

The document processing apparatus, document processing method and scanner provided by the disclosure can determine greatly an orientation of a document, and the document processing apparatus, document processing method and scanner provided by the disclosure can determine greatly an orientation of a document especially when the quality of the document image obtained by scanning is poor.

A brief summary about the technical solution of the disclosure is provided above to provide basic understandings related to some aspects of the technical solution of the disclosure. It shall be understood that this summary is not an exhaustive summary related to the technical solution of the disclosure. The summary is not intended to determine a key part or an important part of the technical solution of the disclosure, nor does it intend to limit the scope of the technical solution of the disclosure. The purpose of the summary is only to provide some concepts in simplified forms as a prelude of the more detailed descriptions discussed later.

Referring to the explanations of the technical solution of the disclosure provided in conjunction with the Drawings, the above and other advantages of the technical solution of the disclosure will be more apparent.

BRIEF DESCRIPTION OF THE FIGURES

The technical solution of the disclosure may be understood better by referring to the description provided in conjunction with the drawings, wherein the same or similar reference sign is used to represent the same or similar component in the Drawings. The Drawings together with the detailed description provided below are included in the Description and form a part of the Description, and they are used to further illustrate the preferred embodiments of the disclosure and explain the principles and the advantages of the disclosure. In the Drawings.

Those with skill in the art shall appreciate that each component in the Drawings is shown for the sake of simplicity and clearness, and is not necessarily drawn in ratio. For example, a size of some component in the Drawings may be enlarged with respect to that of other component to facilitate to understand the embodiment of the disclosure.

DETAILED DESCRIPTION

Preferred embodiments of the disclosure will be described hereinafter by referring to the Drawings. For the sake of clarity and conciseness, all of the features of the actual embodiments are not described in the specification. However, it should be understood that a lot of decisions specific to the embodiments must be made in the process of developing any such actual embodiment, in order to achieve the developer's specific goals, for example, for complying with system- and business-related constraints, wherein these constraints may change over the differences of the embodiments. Furthermore, it should be understood that although the development work may be very complicated and time consuming, this development work is merely a routine task for those with skill in the art benefiting from the disclosure.

It needs to further indicate that, to avoid blurring of the technical solution of the disclosure due to unnecessary details, only apparatus structures and/or processing steps closely related to the technical solution of the disclosure are illustrated in the Drawings, and other details not closely related to the technical solution of the disclosure are omitted.

The technical terms are used in the invention for the purpose of describing specific example embodiments, but not for limitation. As used in the invention, the single form "a", "one" and "this, that, it" may intend to include a plural form unless other cases are indicated clearly in the context. Technical terms "comprising", "including" and "having" are open, and thus indicate existence of features, integers, steps, operations, elements, components and/or groups of those items. It shall not be understood that the process step, the process and the operation are executed in a specific order as discussed or shown in the drawings, unless they are specifically marked in an order of execution. It shall also be understood that an additional or alternate step may be used.

According to an embodiment of the disclosure, there is provided a document processing apparatus, comprising: a text line extraction unit, configured to extract at least one text line from an input document; a language classification unit, configured to determine, by performing an graphic feature recognition process, whether an OCR process is necessary for a language of the input document; an OCR unit, configured to determine, by performing the OCR process, an OCR confidence with respect to each candidate direction for each of at least some of the text lines, in the case that it is determined that the OCR process is necessary for the language of the input document; an graphic feature recognition unit, configured to determine, by performing the graphic feature recognition processing, an graphic feature recognition confidence with respect to each candidate direction for each of text lines; and a determination unit, configured to determine, based on at least one of the determined graphic feature recognition confidences and the determined OCR confidences, a combination confidence with respect to each candidate direction for each of the at least some of the text lines, and determine, based on the combination confidences, an orientation of the input document.

According to an embodiment of the disclosure, there is further provided a scanner using the document processing apparatus for determining an orientation of an input document.

According to an embodiment of the disclosure, there is further provided a document processing method, comprising: extracting at least one text line from an input document; determining, by performing an graphic feature recognition process, whether an OCR process is necessary for a language of the input document; determining, by performing the OCR process, an OCR confidence with respect to each candidate direction for each of at least some of the text lines, in the case that it is determined that the OCR process is necessary for the language of the input document; determining, by performing the graphic feature recognition processing, an graphic feature recognition confidence with respect to each candidate direction for each of text lines; and determining, based on at least one of the determined graphic feature recognition confidences and the determined OCR confidences, a combination confidence with respect to each candidate direction for each of the at least some of the text lines, and determining, based on the combination confidences, an orientation of the input document.

(Embodiments of the Document Processing Apparatus)

Figure 1:
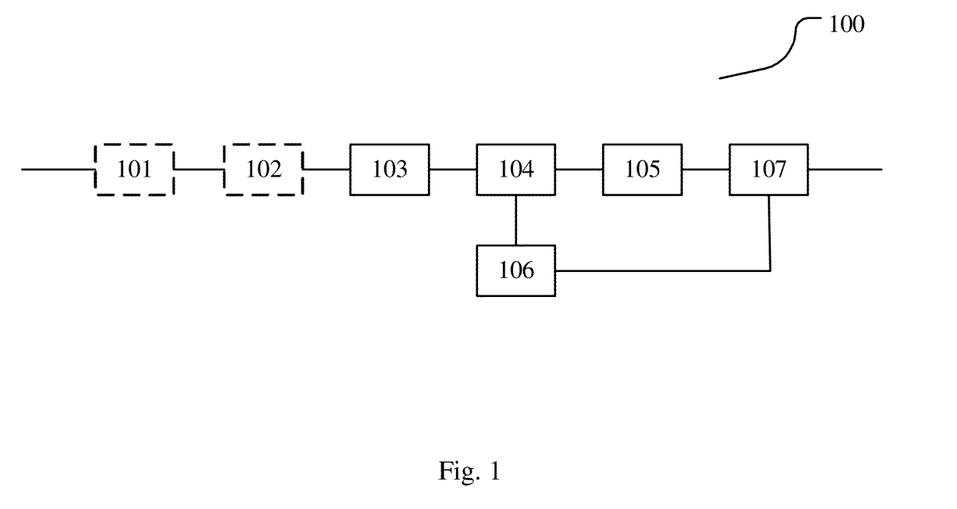
FIG. 1 is a block diagram showing schematically a structure of an information processing apparatus according to an embodiment of the disclosure.

First of all, a document processing apparatus 100 according to an embodiment of the disclosure is described by referring to FIG. 1.

The document processing apparatus 100 comprises a resizing unit 101, a binarization unit 102, a text line extraction unit 103, a language classification unit 104, an OCR unit 105, an graphic feature recognition unit 106 and a determination unit 107.

The document processing apparatus 100 receives a document from the outside, and the document may be obtained by scanning a document having a physical carrier (such as paper documents and film documents), or may be from a photo taken from a document having a physical carrier or other image files including a document.

The input document firstly enters the resizing unit 101. The resizing unit 101 resizes the input document and provides the resized document to the binarization unit 102.

The resizing performed here is usually to reduce an image of the input document in a certain proportion or to reduce an image of the input document to a certain size, so as to decrease the computing amount required by subsequent processes. Of course, enlargement or other required processes may be performed on the image of the input document according to actual requirements, for example, correction of inclination or fold caused by displacement of the paper document in scanning. Since those processes are known to those with skill in the art, detailed descriptions are omitted here.

It is noted that the resizing unit 101 shown by dashed box in FIG. 1 is not necessary, for example, when an image of an input document is an image in suitable size, it is not necessary to set a resizing unit 101, and the input image may be provided directly to the binarization unit 102.

The binarization unit 102 converts the input document into binarization image document upon receiving a resized document from the resizing unit 101 or receiving directly the input document, and provides the converted document to the text line extraction unit 103 for text line extracting.

Figure 2:
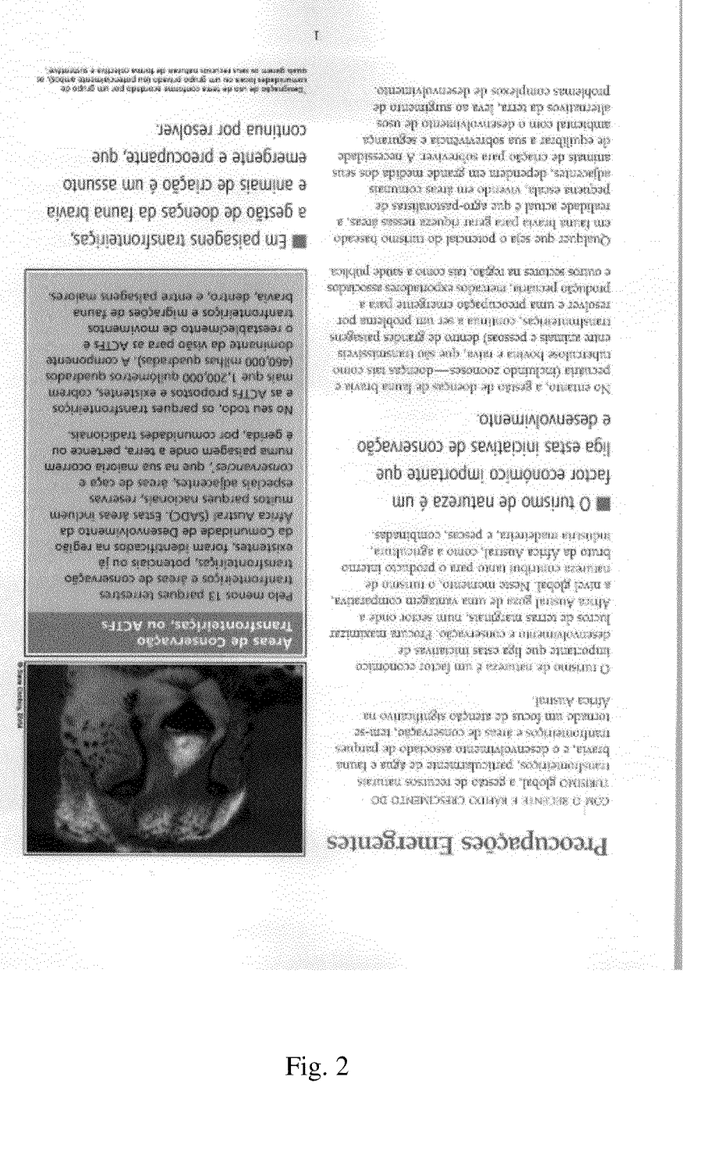
FIG. 2 is a schematic view of an example of a document having grayscale image.
Figure 3:
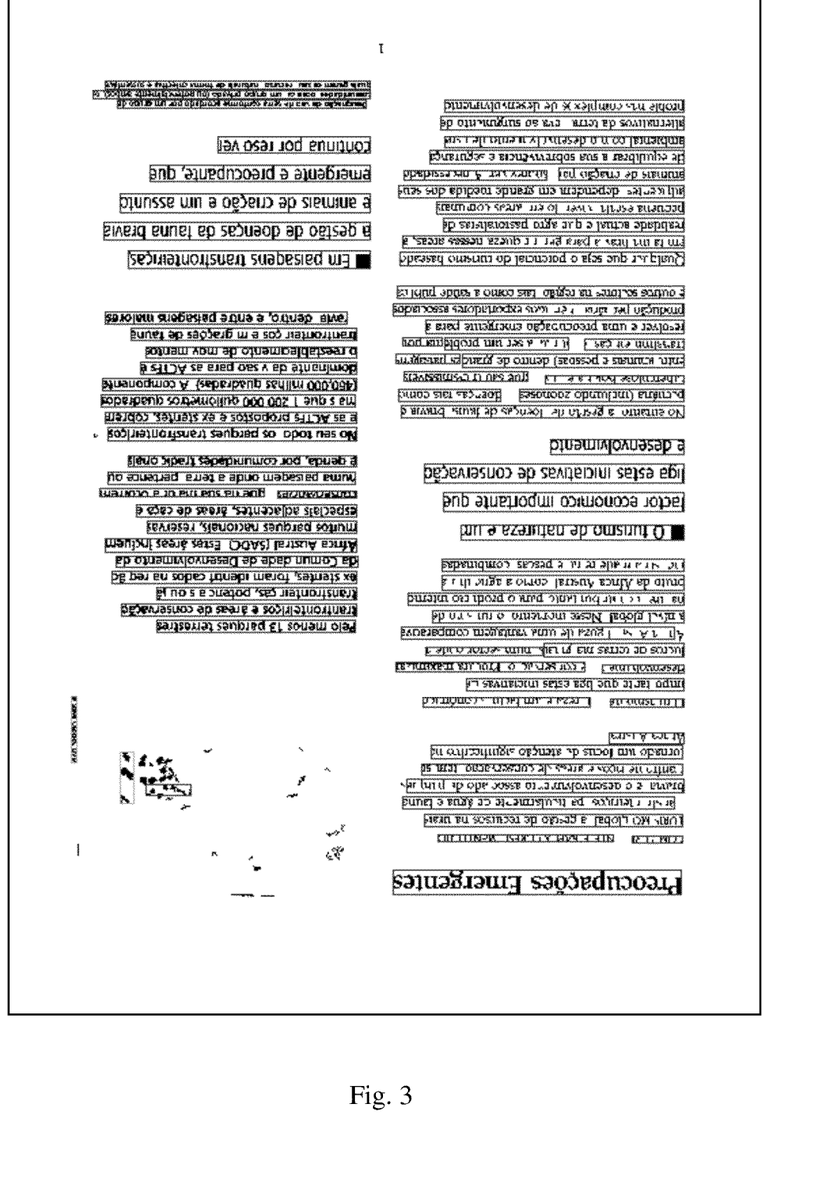
FIG. 3 is a schematic view of an example of a binarized document marked with a candidate text line.

The binarization performed here is a binarization process known in a common sense, for example, foreground and background segmentation is performed on an input document having grayscale image to facilitate subsequent processes on the character portions in the image. For example, FIG. 2 is a schematic view of an example of a document having a grayscale image, and FIG. 3 is a schematic view of an example of a binarized document. It is noted that FIG. 3 further indicates a candidate text line (described latter) marked with rectangular blocks which are not generated because of the binarization processing. In addition, it is noted that pages of FIG. 2 and FIG. 3 are reversed, and this is conventional in the process for determining an orientation of a document.

The binarization may be performed for example by Otsu method or Niblack method, however, the disclosure is not limited thereto, and other suitable methods may also be used.

For specific details of the binarization, for example, you may refer to Evaluation of Binarization Methods for Document Images, Øivind Due Trier and Torfinn Taxt, IEEE Trans, Pattern Anal, Mach, Intell, 17(3): 312-315 (1995)).

Of course, those with skill in the art shall appreciate that the binarization performed here may be performed for a color image of the input document. Moreover, the binarization process may not be performed, for example, when the input document is a black and white image which requires no binarization process. Therefore, the binarization unit 102 shown by dashed block in FIG. 1 is not necessary, and the binarization unit 102 may not be set, and thus the resized document provided by the resizing unit 101 or the directly input document is provided to the text line extraction unit 103 directly.

The text line extraction unit 103 extracts at least one text line based on a document input from the resizing unit 101 or the binarization unit 102 or a document input directly.

Figure 4:
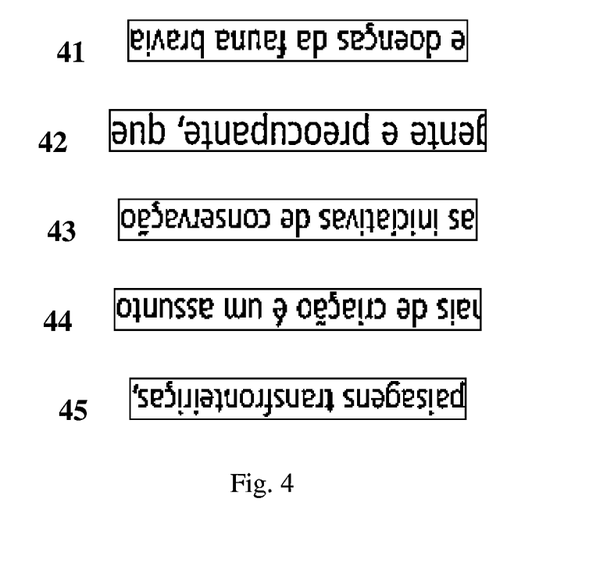
FIG. 4 is a schematic view showing an example of the selected text line.

Specifically, the text line extraction unit 103 for example may firstly extract a candidate character on the basis of analysis on the connected component (CC) in an image, and then connect adjacent characters into a string on a basis of a spatial position relation between characters so as to form a candidate text line, as marked with the rectangular block in FIG. 3. It should be noted that those candidate text lines may not be real text lines, such as, the two rectangular blocks at the lower left part in FIG. 3. Therefore, there is a need of selecting a candidate text line which is most likely the line of the character in the document, and using the selected candidate text line as the text line. It should be noted that the text line includes at least one text line. FIG. 4 shows a schematic view of an example of the selected text line.

At least one candidate text line may be selected as a text line according to the height or length of a text line, a result of texture analysis performed on the text line or a combination of the above factors when selecting a text line. The method of selecting a text line performed here is well known to those with skill in the art, and the technical details are omitted here.

In addition, those with skill in the art may select any suitable processing method for extracting a text line according to actual requirements.

In the embodiment, as shown in FIG. 4, 5 candidate text lines which are more likely to be a line of the characters in the document are selected as a text line for facilitating the description. However, the disclosure is not limited thereto, and other predetermined number of candidate text lines may also be selected as a text line, and usually, the number of the selected text line is more than 5, for example, 20.

Preferably, text line confidences may be calculated for each candidate text line when selecting a candidate text line. The higher the possibility of the candidate text line being a line of the character in the document is, the higher the text line confidence of the candidate text line will be. For example, as to 5 text lines 41, 42, 43, 44, and 45 shown in FIG. 4, the text line confidences decrease sequentially from top to bottom. That is, the text line 41 at the most upper part has the highest text line confidence, and the text line 45 at the lowest part has the lowest text line confidence. Those with skill in the art shall appreciate that the method of calculating text line confidences is also well known and any suitable processing method may be selected for calculating text line confidences according to actual requirements.

A predetermined number of candidate text lines may be selected as the text line based on the calculated candidate text line confidences, and it is also possible not to select a predetermined number of candidate text lines as the text line, but selecting at least one candidate text line whose text line confidence is higher than a preset threshold as a text line. However, the disclosure is not limited thereto, and the threshold may be set in advance, or set according to a distribution of the text line confidences of all of the candidate text lines of the current document, etc. For example, the threshold may be set as an average value, a median of the text line confidences of all of the candidate text lines of the current document or any other suitable value.

The text line extraction unit 103 provides the language classification unit 104, the OCR unit 105 and the graphic feature recognition unit 106 with the extracted text line, preferably the text line confidences of those text lines.

The language classification unit 104 performs language classification on the received text lines according to the graphic feature of the text lines, so as to determine whether an OCR process is necessary for the language of the input document. Specifically, the language type of the text line may be classified by using for example 2d Run-Length Histogram method and Artificial Neural Network classifying method with respect to the texture feature in the text line. For the details of performing classification by using 2d Run-Length Histogram method and Artificial Neural Network classifying method, please refer to for example, Shijian Lu, Linlin Li and Chew Lim Tan, Identification of Scripts and Orientations of Degraded Document Images, Pattern Anal, Appl, 13(4), 469-475(2010)) and Ranjith Unnikrishnan and Ray Smith, Combined Script and Page Orientation Estimation Using the Tesseract OCR Engine, MOCR, 2009), and the details are omitted here.

By the above language classification, for example, the languages of the text line may be classified into classes of Chinese, Japanese, Korean, Latin, normal Arabic, reverse Arabic, normal Indic and reverse Indic.

It should be noted that each class includes more than one type of character/letter. For example, the class of Latin may include a letter with characteristic similar to the Latin, such as Kirill alphabet (for example, Serbian and Russian) and Greek alphabet (for example Greek). Classes of normal Arabic and reverse Arabic include respectively normal and reverse Arabic alphabets (such as Arabic). Classes of normal Indic and reverse Indic include respectively normal and reverse Sanskrit, Tamil, Aisne German, Bengali, etc.

The classification is performed in such a manner because the inventor of the disclosure has found by research that for the former three classes of languages, that is, documents in Chinese and Japanese, Korea and Latin, it is impossible to determine an orientation of a text line only according to an graphic feature of the document, especially when the quality of the image is poor. In this case, an OCR process is necessary for the text line of those classes of languages to determine the orientation of the text line. While, for the latter four classes of languages, that is, normal Arabic, reverse Arabic, normal Indic and reverse Indic, the orientation of the text line actually has been determined already once the class of the language has been determined, and a further OCR process is not necessary any more.

a language classification of a whole document may be completed on the basis of language classification performed for each text line. For example, text line language confidences may be determined with respect to each candidate language for each of the text lines one by one, according to a descending order of the text line confidences, and based on the determined text line language confidences, a current language confidence may be determined with respect to each candidate language, and in the case that a maximum value among the current language confidences complies with a predetermined condition, the candidate language corresponding to the current language confidence may be determined as the language of the input document. Those with skill in the art shall appreciate that the text line language confidences may be determined for each text line one by one according to any other order.

It shall be noted that "each candidate language" mentioned here may be various language classes classified according to the above mentioned classification methods, or various language classes classified in other manners (as long as the classifying manner may facilitate to determine whether an OCR process is necessary for the language class in determining an orientation of the document), or various specific languages.

The higher the possibility of the language of the text line being a certain candidate language (or a corresponding language class), the higher the text line language confidence for the text line with respect to the candidate language (or a corresponding language class) is. For example, the text line language confidence of a text line with respect to a language (or a corresponding language class) to which it most likely belongs may be set to be 1, and the text line language confidence for the text line with respect to other languages (or a corresponding language class) may be set to be 0. However, the disclosure is not limited thereto, for example, the possibility that the language of the text line is a certain candidate language (or a corresponding language class) may be set as the text line language confidence for the text line with respect to the candidate language (or a corresponding language class), or other suitable manners of setting a text line language confidence can be used.

In addition, a current language confidence for a certain candidate language (or a corresponding language class) may be set to be correlated with a text line language confidence with respect to the candidate language for each of text lines which have been classified (a corresponding language class). For example, a text line language confidence with respect to each candidate language (or corresponding language class) for a text line newly determined each time may be correspondingly accumulated to a current language confidence with respect to each candidate language (or corresponding language class) to thereby obtain a current language confidence of each candidate language (or corresponding language class).

In the case that a maximum value among the current language confidences complies with a predetermined condition, the candidate language (or corresponding language class) corresponding to the current language confidence may be determined as the language of the input document. The predetermined condition for example may be a case where the maximum value among the current language confidences is higher than a predetermined threshold. However, the disclosure is not limited thereto, for example, the condition may be a condition where the maximum value among the current language confidences is larger than the second maximum value by a predetermined amount, or may be any other suitable conditions.

Accordingly, the language classification unit 104 determines the language of the document on the basis of the determination of the language (or corresponding language class) of the text line, and thus determine whether an OCR process is necessary for the language of the document. The language classification unit 104 provides the result of the determination to the OCR unit 105 and the graphic feature recognition unit 106.

The ORC unit 105 determines, by performing the OCR process on at least some of the text lines selected by the text line extraction unit 103, an OCR confidence with respect to each candidate direction for each of the processed text lines, in the case that it is determined by the language classification unit 104 that the OCR process is necessary for the language of the input document. Those with skill in the art shall appreciate that the OCR process is a conventional technical means in the art, and the technical details are omitted here. In addition, those with skill in the art shall further appreciate that the candidate directions are usually the following four types: from top to bottom, from bottom to top, from left to right, and from right to left. Of course, the disclosure is not limited thereto, and there may be other candidate directions in particular cases, for example, when the text line is inclined.

It shall be noted that when determining to perform OCR process, the OCR unit 105 may further refer to the language or a corresponding language class determined by the language classification unit 104. For example, when the OCR unit 105 performs OCR process, a dictionary related to the determined language or the class of the language may be used to thereby improve the efficiency of performing the OCR process.

The higher the proportion of the character recognized by performing OCR process for the text line in a certain candidate direction, the larger the number, and the higher the confidence of the recognition result of the OCR is, the higher the OCR confidence for the text line with respect to the candidate direction is. For example, an OCR confidence with respect to a candidate direction for a certain text line having the best OCR result may be set to be 1, and the OCR confidences with respect to other candidate directions for the text line for other candidate directions are set to be 0. However, the disclosure is not limited there to, for example, the OCR confidence with respect to each candidate direction for the text line may be set to be a number between 0 and 1, or other schemes for setting the OCR confidence may be used.

In addition, for a text line in a certain language, for example, a text line in Latin, the orientation of the text line must be along the tendency of the text line, so OCR process is only considered to be performed in the two directions when performing OCR process, and only OCR confidences with respect to the two candidate directions for the text line need to be calculated, and the OCR confidence with respect to other candidate directions for the text line may be 0 or other value indicating that the OCR confidence with respect to the direction is inhibited. This further reduces calculation amount, and further improves the efficiency of the document processing apparatus 100.

Note that the orientation of the text line being along the tendency of the text line is not truce for all of the languages. An obvious example is Chinese, in which although characters are arranged in horizontal lines in most of the modern Chinese books, in a lot of books such as old Chinese books, characters are arranged in longitudinal lines. A similar situation also exists in Japanese. Therefore, if the language classification unit 104 determines the language of the document as Chinese or Japanese, OCR process is usually necessary in all of the four candidate directions, and OCR confidences with respect to all of the four candidate directions for the text line are calculated.

The OCR unit 105 may determine OCR confidences for at least some of the text lines one by one according to a descending order of the text line confidences, until the determination unit 107 which will be described latter determines the orientation of the document. Since the OCR process usually requires a large amount of calculations, by doing so, the OCR unit 105 performs OCR process only on at least some of the text lines, avoiding unnecessary OCR processes performed when the orientation of the document has been determined, and improving the efficiency of the document processing apparatus 100. For example, if the determination unit 107 has determined an orientation of the document after OCR process has been performed for text lines 41, 42, 43 shown in FIG. 4 one by one, there is no need of performing OCR process on text lines 44 and 45, such that calculation amount is reduced, and the efficiency of the document processing apparatus 100 is improved.

In addition, in case that the text line confidence is not calculated, the OCR unit 105 may also determine OCR confidence for at least some of the text lines one by one according to any order, or determine OCR confidences for all of the text lines uniformly, instead of performing OCR process one by one.

The OCR unit 105 provides the determined OCR confidence to the determination unit 107. Particularly, in a case that the OCR unit 105 determines OCR confidence for at least some of the text lines one by one, the OCR processing unit 105 provides an OCR confidence with respect to each candidate direction for one text line to the determination unit 107 after it is determined each time.

The graphic feature recognition unit 106 determines, by performing a graphic feature recognition, a graphic feature confidence with respect to each candidate direction for each of the text lines selected by the text line extraction unit 103.

Hereinafter a text line consisting of Latin alphabets is taken as an example, for giving an example of determining a graphic feature recognition confidence with respect to a different candidate direction for a text line by a graphic feature.

Figure 5:
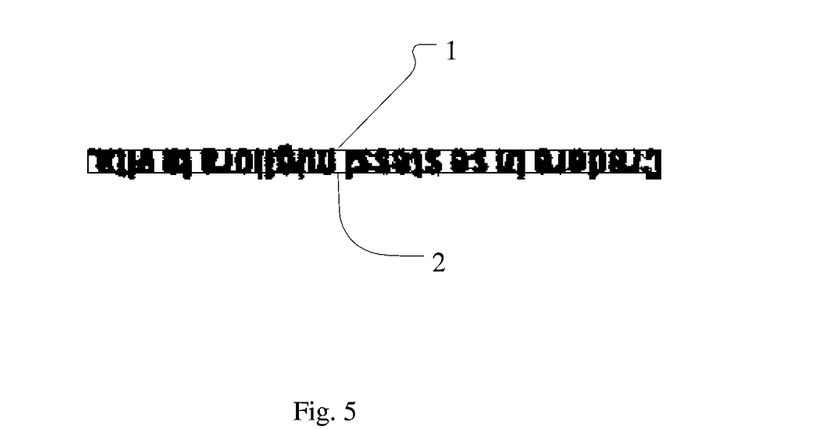
FIG. 5 is a schematic view showing an example of a binarized text line.

FIG. 5 is a schematic view showing an example of a binarized text line. The text line is none of text lines 41, 42, 43, 44 and 45 shown in FIG. 4. In FIG. 5, the top and bottom baselines of the text lines are indicated, wherein 1 is indicative of a first baseline, and 2 is indicative of a second baseline. Those baselines are determined in such a manner that the most majority of images in the text line are located between the baselines. For Latin in a normal orientation (having a direction from left to right), as compared with alphabet "emerging out" from the bottom (that is, some strokes lower than the lower baseline), the alphabet "emerging out" from the top (that is, some strokes higher than the top baseline) is dominant in the amount and/or the using frequency, so in the text line in Latin, the portions of the image beyond the top baseline shall be more than the portions beyond the bottom baseline. In FIG. 5, the portions beyond the second baseline 2 in the image are more than the portions beyond the first baseline 1, so it may be determined that the text line in FIG. 5 is most likely to be reserved according to the statistical features of the portions beyond the first and second baselines. That is, the graphic feature recognition confidence with respect to a candidate direction from left to right for the text line in FIG. 5 is relatively low, while the graphic feature recognition confidence with respect to a candidate direction from right to left is relatively high. As for candidate directions from top to bottom and from bottom to top, since it is known that the text line is text line in Latin and the text line is not along a vertical direction, the orientation of the text line shall necessarily not be a direction from top to bottom or from bottom to top, and thus the graphic feature recognition confidence with respect to the candidate directions from top to bottom and from bottom to top for the text line is 0.

Moreover, the disclosure is not limited thereto, the graphic feature recognition confidence with respect to a most likely candidate direction, determined by performing an graphic feature recognition, for a text line may be set to be 1, and the graphic feature recognition confidence with respect to other candidate directions for the text line is set to be 0, or other suitable schemes of setting an graphic feature recognition confidence may be used.

Of course, the disclosure is not limited to the example of the graphic feature recognition provided above, and other suitable graphic features may be used, for example, for various classes of languages, to determine the graphic feature recognition confidence with respect to various candidate directions for the text line. The above mentioned various processes of graphic feature recognition are well known in the art, and the technical details are omitted here.

As stated above, when determining to perform a graphic feature recognition process, the graphic feature recognition unit 106 may select a corresponding recognition method and/or criterion by referring to the language or a corresponding language class determined by the language classification unit 104. Particularly, when the language classification unit 104 has determined, by performing an graphic feature recognition process, that ORC process is not necessary for the language of the input document, that is, when the language classification unit 104 has determined an orientation of the document while the language of the document is determined, the graphic feature recognition confidence for the text line may be determined directly according to the text line language confidence for each of the text lines, for example, the text line language confidence for each of the text lines may be used directly as an graphic feature recognition confidence for the text line.

In addition, regardless of the determination result of the language classification unit 104, the language classification unit 104 may determine an graphic feature recognition confidence for the text line by means of the performed graphic feature recognition process while determining a text line language confidence with respect to each candidate language for the text line by performing an graphic feature recognition process. That is, the function of the graphic feature recognition unit 106 may be implemented by the language classification unit 104, such that a separate graphic feature recognition unit 106 is omitted from the hardware to further improve efficiency of the document processing apparatus 100.

The graphic feature recognition unit 106 provides the graphic feature recognition confidence determined above to the determination unit 107.

The determination unit 107 determines, based on at least one of OCR confidences received from the OCR unit 105 and the graphic feature recognition confidences received from the graphic feature recognition unit 106, a combination confidence with respect to each candidate direction for each of the at least some of the text lines, and determines, based on the combination confidences, an orientation of the input document. As to the expression "at least some of the text lines", in case that ORC process is necessary for the text line, it refers to text lines on which OCR process has been performed and the OCR confidence has been obtained, and in case that the ORC process is not necessary for the text line, it refers to all of the text lines on which graphic feature recognition process has been performed and the graphic feature recognition confidence has been obtained.

In addition, when OCR process is necessary for the text line, the determination unit 107 may determine a combination confidence based on both the OCR confidences and the graphic feature recognition confidences, or determine a combination confidence only based on the OCR confidences. When OCR process is not necessary for the text line, the determination unit 107 may determine a combination confidence only based on the graphic feature recognition confidences.

Specifically, when determining a combination confidence based on both the OCR confidences and the graphic feature recognition confidences, the determination unit 107 may set the combination confidence with respect to each candidate direction for the text line as an average value, a multiplication or other suitable form of the OCR confidence and the graphic feature recognition confidence with respect to the candidate direction for the text line, as long as the combination confidence with respect to the candidate direction for the text line is positively correlated with the OCR confidence and the graphic feature recognition confidence with respect to the candidate direction for the text line. In addition, when determining a combination confidence, the determination unit 107 may further refer to text line confidences provided by a text line extraction unit 103, for example, setting the combination confidence for the text line with respect to each candidate direction as a multiplication of text line confidences of the text line by an average value of the OCR confidence and the graphic feature recognition confidence for the text line with respect to the candidate direction. Of course, the disclosure is not limited thereto, as long as the combination confidence for the text line with respect to the candidate direction is positively correlated with the text line confidence for the text line with respect to the candidate direction.

Based on a combination confidence with respect to each candidate direction for each of the text lines, for example, a sum of combination confidences with respect to each candidate direction for the text lines on which the above determination process have been performed may be obtained, and the candidate direction having the highest sum of the combination confidences may be used as an orientation of the whole document.

Particularly, when the OCR unit 105 determines OCR confidence for at least some of the text lines one by one according to descending order of the text line confidences, the determination unit 107 may also determine a combination confidence fore each of the at least some of the text lines one by one according to a descending order of text line confidences, determine current confidences with respect to each candidate direction according to the determined combination confidences, and determine, when the maximum value among the current confidences complies with a predetermined condition, a candidate direction corresponding to the current confidence as an orientation of the input document.

By doing so, the determination unit 107 performs a determination process on some of the text lines one by one, if an orientation of the document has been determined by the determination process currently performed, the OCR process requiring much more calculation amount is not necessary for the other text lines, such that the efficiency of the document processing apparatus 100 is improved. For example, if a determination process has been performed on text lines 41, 42, 43 shown in FIG. 4 one by one and the determination 107 has determined an orientation of the document, the OCR confidence unit 104 does not perform OCR process on text lines 44 and 45 any more, such that an amount of calculation is reduced, and the efficiency of the document processing apparatus 100 is improved.

Specifically, when a current confidence with respect to each candidate direction is set, for example, a combination confidence with respect to each candidate direction for a text line newly determined each time may be correspondingly accumulated to a current confidence with respect to each candidate direction so as to obtain current confidences with respect to each candidate direction.

In addition, a determination of a current confidence may be performed based on the determined combination confidence and the text line confidence. For example, the combination confidences of the text line having a higher text line confidence may have a higher weight among the current confidences.

When a maximum value among the current confidences complies with a predetermined condition, a candidate direction corresponding to the current confidence may be determined as the language of the input document. The predetermined condition may be for example a case that the maximum value among the current confidences is higher than a certain predetermined threshold. However, the disclosure is not limited thereto, for example, the condition may indicate that the maximum value among the current confidences is larger than the second maximum value among the current confidences by a predetermined amount, or may be any other suitable conditions.

Furthermore, in the case that the language classification unit 104 has determined an orientation of the document while determining the language of the document, since ORC is not necessary for each text line, an graphic feature recognition confidence for the text line may be determined directly according to text line language confidence for each text line, and further a combination confidence for the text line may be determined directly according to the text line language confidence for each text line, even more, the orientation of the document may be obtained by the determination unit 107 directly according to the orientation of the document determined by the language classification unit 104, so that the combination confidence or the current combination confidence is not calculated any more. In such a case, the amount of calculation is further reduced, and the efficiency of the image processing device 100 is improved.

By the document processing apparatus 100 described above, an orientation of the document may be determined by performing the graphic feature recognition process and the OCR process at the same time, and preferably the operation amount required by the determination may be reduced as much as possible with respect to the language of the document. Therefore, the document processing apparatus according to an embodiment of the disclosure may determine the orientation of the document better, and is especially applicable for determining an orientation of the document when the quality of the image of the document is deteriorated.

(Embodiments of the Document Processing Method)

Figure 6:
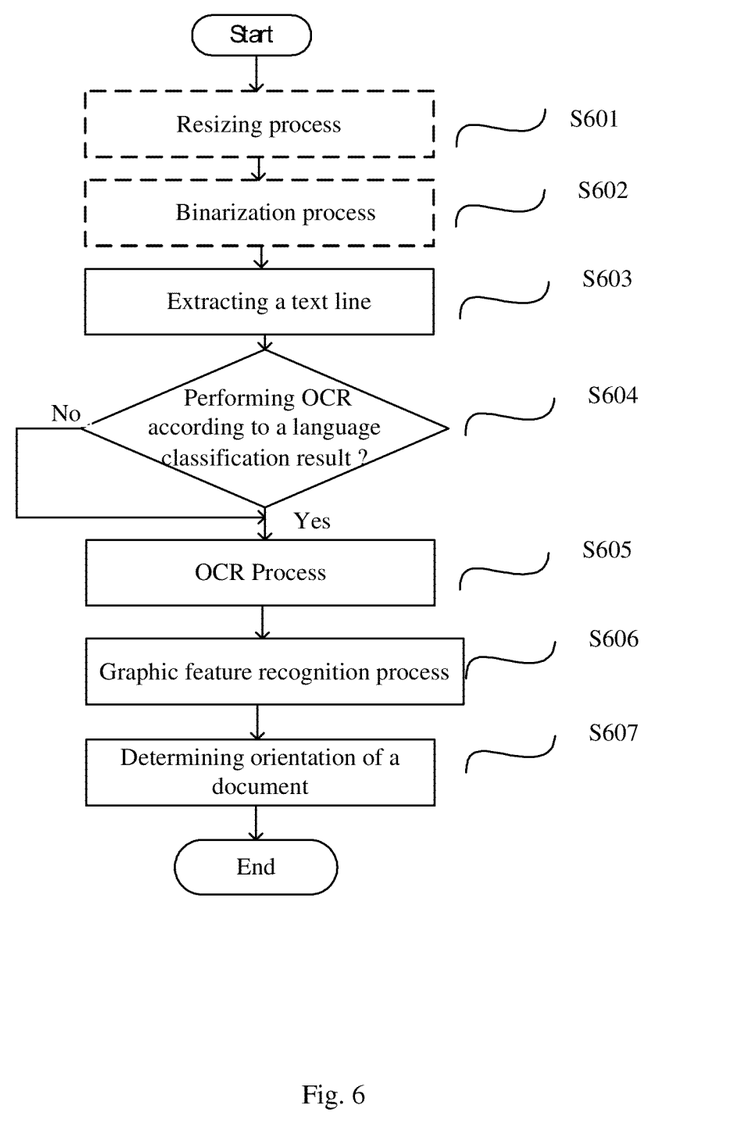
FIG. 6 is a flow chart describing a procedure of a document processing according to an embodiment of the disclosure.

Hereinafter, the process of the document processing method according to an embodiment of the disclosure may be described by referring to FIG. 6. The document processing method for example may be a process executed by the document processing apparatus 100. FIG. 6 is a flowchart describing a procedure of the document process according to an embodiment of the disclosure.

After the process starts, the process firstly enters step S601. In step S601, an input document is resized, and the process proceeds to step S602. The step S601 may be for example executed by a function unit similar to the previously described resizing unit 101, and the technical details of the step S601 are omitted here since reference can be made to the previous description of the resizing unit 101. In addition, similar to the case mentioned when the resizing unit 101 is described, the step S601 marked with dashed box is not necessary which may be skipped and the subsequent step is executed directly.

In step S602, the input document is converted into a document having a barinarized image, and the process proceeds to step S603. The step S602 may be for example executed by a function unit similar to the previously described binarization unit 102, and the technical details of the step S602 are omitted here since reference can be made to the previous description of the resizing unit 102. Furthermore, similar to the case mentioned when the binarization unit 102 is described, the step S602 marked with dashed box is not necessary which may be skipped and the subsequent step is executed directly.

In step S603, at least one image which is most likely to be a line of the character in the document is extracted as a text line, and the process proceeds to step S604. The step S603 may be for example executed by a function unit similar to the previously described text line extraction unit 103, and the technical details of the step S603 are omitted here since reference can be made to the previous description of the text line extraction unit 103 previously.

In step S604, language classification is performed on the received text lines according to the graphic features so as to determine whether OCR process is necessary for the language of the input document. When it is determined that OCR process is necessary, the process proceeds to step S605; otherwise, the process proceeds to step S606. The step S604 for example may be executed by a function unit similar to the previously described language classification unit 102, and the technical details of the step S604 are omitted here since reference can be made to the previous description of the language classification unit 104 previously.

In step S605, an OCR confidence with respect to each candidate direction for at least some of the text lines is determined by performing an OCR process, and the process proceeds to step S606. The step S605 may be executed for example by a function unit similar to the previously described OCR unit 105, and the technical details of the step S605 are omitted here since reference can be made to the previous description of the OCR unit 105 previously.

In step S606, a graphic feature recognition confidence with respect to each candidate direction for each of the text lines is determined by performing a graphic feature recognition process, and the process proceeds to step S607. The step S606 may be executed for example by a function unit similar to the previously described graphic feature recognition unit 106, and the technical details of the step S606 are omitted here since reference can be made to the previous description of the graphic feature recognition unit 106 previously. Furthermore, similar to the case mentioned when the graphic feature recognition unit 106 is described, the process in the step S606 may be combined into step S604 for completion. Moreover, similar to the case mentioned in describing the determination unit 107, after step S605 has been performed, the step S606 may not be performed, and skipped over to perform the subsequent process directly.

In step S607, a combination confidence is determined based on at least one of the graphic feature recognition confidence and the ORC confidence, and an orientation of the input document is determined based on the combination confidence, and the process ends. The step S607 may be executed for example by a function unit similar to the previously described determination unit 107, and the technical details of the step S607 are omitted here since reference can be made to the previous description of the graphic feature determination unit 107 previously.

Accordingly, by the above information processing method, an orientation of the document may be determined by performing the graphic feature recognition process and the OCR process at the same time, and preferably the operation amount required by the determination may be reduced as much as possible for the language of the document. Therefore, the document processing method according to an embodiment of the disclosure may determine the orientation of the document better, which is especially applicable for determining an orientation of the document when the quality of the image of the document is deteriorated.

(Hardware Configuration Embodiments)

Each component, subunit and the like of the document processing apparatus according to the disclosure may be configured by software, hardware, firmware or any combination thereof. In case of implementation by means of software or firmware, the program constituting the software or the firmware may be mounted on a machine having a dedicated hardware structure (for example, the general purpose machine 700 shown in FIG. 7) from a storage medium or network, and the machine is mounted with various programs, the machine can execute various functions of each of the components and subunits.

Figure 7:
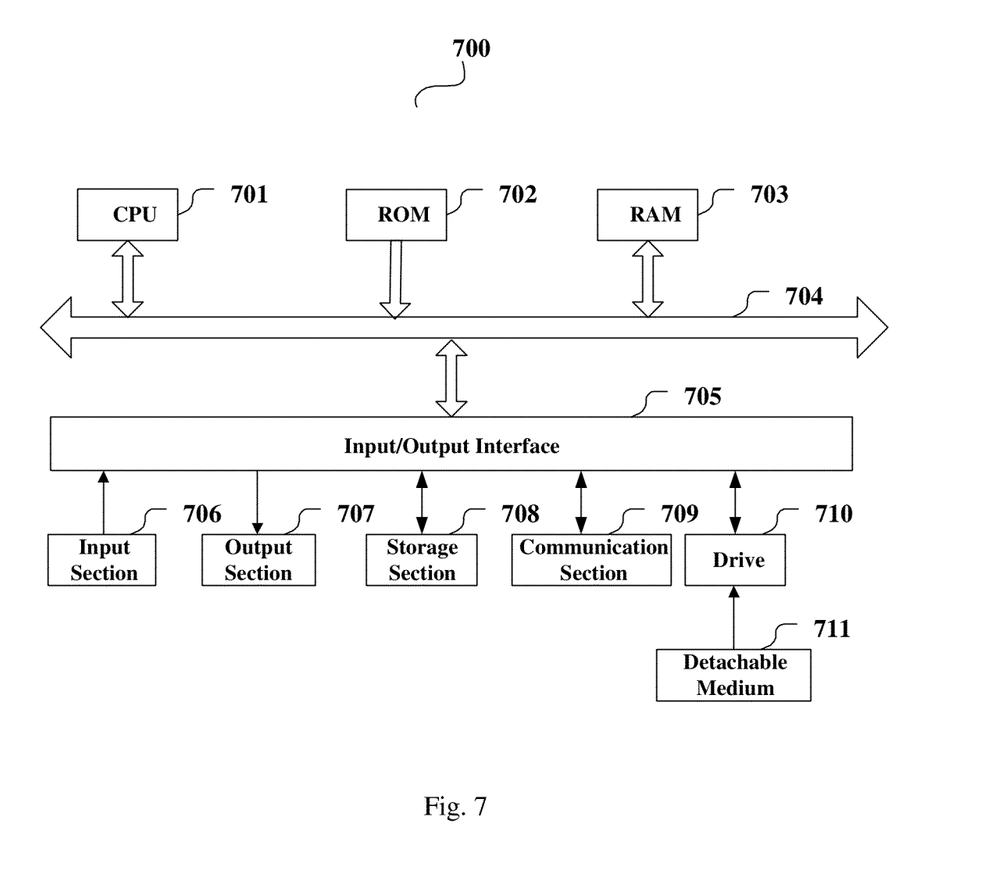
FIG. 7 is a structure view schematically showing a possible hardware configuration of an image processing device which can be used to implement the information processing method and the information processing apparatus according to an embodiment of the disclosure.

FIG. 7 is a structure view showing schematically a hardware configuration of a possible document processing device which can be used to implement the document processing method and the document processing apparatus according to an embodiment of the disclosure.

In FIG. 7, a central processing unit (CPU) 701 performs various processes according to the program stored in the Read-Only Memory (ROM) 702 or programs loaded from the storage section 708 to the Random Access Memory (RAM) 703. Data required when the CPU 701 performs various processes is also stored in the RAM 703. CPU 701, ROM 702 and RAM 703 are connected from one to another via bus 704. Input/output interface 705 is also connected to the bus 704.

The following components are connected to the input/output interface 705: input section 706, including keyboard, mouse, etc.; output section 707, including display, such as cathode ray tube (CRT), liquid crystal display (LCD), etc., and speakers and so on; storage section 708, including hard disc, etc.; and communication part 709, including network interface cards such as LAN cards, modems and so on. The communication section 709 performs communication process via network like the internet. According to requirements, a drive 170 is also connected to the input/output interface 705. Detachable medium 711 such as magnetic disc, CD, magneto-optical disc, semiconductor memory, and so on is installed on the drive 710 based on requirements, such that the computer program read out therefrom is installed in the storage section 708 as needed.

In case of implementing the above processes by software, programs constituting the software are installed from a network like the Internet or from a storage medium like the detachable medium 711.

Those with skill in the art should be understood that such storage medium is not limited to the detachable medium 711 which is stored with programs and distributed separately from the method to provide a user with program as shown in FIG. 7. The example of the detachable medium 711 includes magnetic disc, CD (including CD read only memory (CD-ROM) and digital versatile disc (DVD)), magneto-optical disc (including mini-disc (MD)) and semiconductor memory. Alternatively, the storage medium may be ROM 702, or hard disc included in the storage section 708 in which a program is stored and the program is distributed to a user with the method including the same.

In addition, the disclosure further provides a program produce storing a machine readable instruction code. When read and executed by a machine, the instruction code is capable of executing the document processing method according to an embodiment of the invention. Correspondingly, various storage media such as magnetic disc, CD, and magneto-optical disc carrying such a program code are also included in the technical solution of the disclosure.

In addition, each of the operations of the document processing method according to an embodiment of the disclosure may also be implemented by a program which is stored in various machine readable storage media and executable by a computer.

It should be noted that each component of the document processing apparatus according to an embodiment of the disclosure may be an independent component, or functions of a number of units may be implemented by one component.

In addition, it should be noted that steps of the document processing method according to the disclosure are not necessarily performed according to the order disclosed in the disclosure, and they may be executed in parallel or by calling, for example, it is not necessary to execute the step S601 before the step S602, and the step S601 may be executed after the step S602, or they can be executed in parallel. It is also not necessary to execute the step S605 before the step S606, and the step S605 may be executed after the step S606, or they can be executed in parallel.

As to the implementing manners including the above embodiments, the following appendixes are further disclosed:

Appendix 1. A document processing apparatus, comprising:

a text line extraction unit configured to extract at least one text line from an input document;

a language classification unit configured to determine, by performing an graphic feature recognition process, whether or not an optical character recognition process is necessary for a language of the input document;

an optical character recognition unit configured to determine, by performing the optical character recognition process, an optical character recognition confidence with respect to each candidate direction for each of at least some of the text lines, in the case that it is determined that the optical character recognition process is necessary for the language of the input document;

an graphic feature recognition unit configured to determine, by performing the graphic feature recognition processing, an graphic feature recognition confidence with respect to each candidate direction for each text lines; and a determination unit configured to determine, based on at least one of the determined graphic feature recognition confidences and the determined optical character recognition confidences, a combination confidence with respect to each candidate direction for each of the at least some of the text lines, and determine, based on the combination confidences, an orientation of the input document.

Appendix 2. The document processing apparatus according to Appendix 1, wherein:

the language classification unit is further configured to determine that the optical character recognition process is necessary for the language of the input document, in the case that the language of the input document is determined to be Chinese, Japanese, Korean or a language in Latin alphabet.

Appendix 3. The document processing apparatus according to Appendix 1 or 2, wherein:

the text line extraction unit is further configured to calculate, for each of the text lines, the possibility of being a line of characters in the document as a text line confidence; and the optical character recognition unit is further configured to determine, according to an descending order of the text line confidences, the optical character recognition confidence for each text line one by one, until the orientation of the document is determined by the determination unit.

Appendix 4. The document processing apparatus according to Appendix 3, wherein:

the determination unit is further configured to determine, according to the descending order of the text line confidences, the combination confidence for each of the at least some of the text lines, determine, based on the determined combination confidences, a current confidence with respect to each candidate direction, and determine, in the case that a maximum value among the current confidences complies with s a first predetermined condition, the candidate direction corresponding to the current confidence of the maximum value to be the orientation of the input document.

Appendix 5. The document processing apparatus according to Appendix 4, wherein:

the determination unit is further configured to determine, based on the determined combination confidences and the determined optical character recognition confidences, the current confidence with respect to each candidate direction.

Appendix 6. The document processing apparatus according to Appendix 3, wherein:

the text line extraction unit is further configured to calculate, for each of the text lines, the possibility of being a line of characters in the document as a text line confidence; and the language classification unit is further configured to determine, according to a descending order of the text line confidences, a text line language confidence with respect to each candidate language for each of the text lines one by one, determine, based on the determined text line language confidences, a current language confidence with respect to each candidate language, and determine, in the case that a maximum value among the current language confidences complies with a second predetermined condition, the candidate language corresponding to the language confidence of the maximum value as the language of the input document.

Appendix 7. The document processing apparatus according to any of Appendixes 1 to 6, further comprising:

a resize unit configured to resize the input document and provide the resized document to the text line extraction unit for extracting the text lines.

Appendix 8. The document processing apparatus according to any of Appendixes 1 to 7, further comprising:

a binarization unit configured to convert the input document into a binarized image document, and provide the binarized image document to the text line extraction unit for extracting the text lines.

Appendix 9. A scanner, comprising the document processing apparatus according to any of Appendixes 1 to 8 for determining the orientation of the input document.

Appendix 10. A document processing method, comprising:

extracting at least one text line from an input document;

determining, by performing an graphic feature recognition process, whether or not an optical character recognition process is necessary for a language of the input document;

determining, by performing the optical character recognition process, an optical character recognition confidence with respect to each candidate direction for each of at least some of the text lines, in the case that it is determined that the optical character recognition process is not necessary for the language of the input document;

determining, by performing the graphic feature recognition processing, an graphic feature recognition confidence with respect to each candidate direction for each text lines; and determining, based on at least one of the determined graphic feature recognition confidences and the determined optical character recognition confidences, a combination confidence with respect to each candidate direction for each of the at least some of the text lines, and determining, based on the combination confidences, an orientation of the input document.

Appendix 11. The document processing method according to Appendix 10, wherein in the language classification step, it is determined that the optical character recognition process is necessary for the language of the input document, in the case that the language of the input document is determined to be Chinese, Japanese, Korean or a language in Latin alphabet.

Appendix 12. The document processing method according to Appendix 10 or 11, wherein in the text line extraction step, for each of the text lines, the possibility of being a line of the characters in the document is further calculated as text line confidences; and in the optical character recognition step, the optical character recognition confidence for each text line is further determined one by one according to an descending order of the text line confidences, until the orientation of the document is determined by the determination step.

Appendix 13. The document processing method according to Appendix 12, wherein in the determination step, the combination confidence for each of the at least some of the text line is determined according to the descending order of the text line confidences, a current confidence with respect to each candidate direction is determined based on the determined combination confidences, and in the case that a maximum value among the current confidences meets a first predetermined condition, the candidate direction corresponding to the current confidence of the maximum value is determined to be the orientation of the input document.

Appendix 14. The document processing method according to Appendix 13, wherein in the determination step, the current confidence with respect to each candidate direction is determined based on the determined combination confidences and the determined optical character recognition confidences.

Appendix 15. The document processing method according to any of appendixes 10-14, wherein in the text line extraction step, for each of the text lines, the possibility of being a line of the characters in the document is further calculated as text line confidences; and in the language classification step, a text line language confidence with respect to each candidate language for each of the text lines is determined one by one according to a descending order of the text line confidences, a current language confidence with respect to each candidate language is determined based on the determined text line language confidences, and in the case that a maximum value among the current language confidences complies with a second predetermined condition, the candidate language corresponding to the language confidence of the maximum value is determined as the language of the input document.

Appendix 16. The document processing method according to any of appendixes 10 to 15, further comprising:

a resizing step for resizing the input document and applying the resized document for extracting the text lines in the text line extraction step.

Appendix 17. The document processing method according to any of Appendixes 10 to 16, further comprising:

a binarization step for converting the input document into a binarized image document, wherein the language of the binarized image document is used for extracting the text lines in the text line extraction step.

Appendix 18. A program causing a computer device to execute the document processing method according to any of Appendixes 10 to 17, for determining an orientation of the input document.

Appendix 19. A computer readable storage medium on which a program executable by a computer is stored, and when executed, the program causes the computer device to execute the document processing method according to any of Appendixes 10 to 17.

Although the technical solution of the disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, device, means, methods and steps described in the Description. As one of ordinarily skills in the art will readily appreciate from the disclosure contained in the invention, processes, devices, manufactures, structures of substance, means, methods or steps presently existing or later to be developed, that perform substantially the same function or achieve substantially the same result as the corresponding embodiments described herein may be utilized according to the present invention. Accordingly, the appended claims are intended to include within their scope such processes, devices, manufactures, structures of substance, means, methods or steps.

Although the embodiments of the disclosure have been described in detail by referring to the Figures, it shall be understood that the implementing manners described above are only used to indicate the technical solution of the disclosure, and are not intended to limit the technical solution of the disclosure. Those with skill in the art may make various amendments or alterations to the implementing manners without departing from the substance and the range of the invention. Therefore, the range of the disclosure is only defined by the appended claims and its equivalents.

The invention claimed is:

1. A document processing apparatus, comprising:
a memory;
a processor coupled to the memory and configured to:
extract at least one text line from an input document;

determine, by performing a graphic feature recognition process, whether or not an optical character recognition process is necessary for a language of the input document;

determine, by performing the optical character recognition process, an optical character recognition confidence with respect to each candidate direction for each of at least some of the text lines, in the case that it is determined that the optical character recognition process is necessary for the language of the input document;

determine, by performing the graphic feature recognition processing, a graphic feature recognition confidence with respect to each candidate direction for each text lines; and determine, based on at least one of the determined graphic feature recognition confidences and the determined optical character recognition confidences, a combination confidence with respect to each candidate direction for each of the at least some of the text lines, and determine, based on the combination confidences, an orientation of the input document.

2. The document processing apparatus according to claim 1, wherein:

the processor is further configured to determine that the optical character recognition process is necessary for the language of the input document, in the case that the language of the input document is determined to be Chinese, Japanese, Korean or a language in Latin alphabet.

3. The document processing apparatus according to claim 1, wherein:

the processor is further configured to calculate, for each of the text lines, the possibility of being a line of characters in the document as a text line confidence; and the processor is further configured to determine, according to a descending order of the text line confidences, the optical character recognition confidence for each text line one by one, until the orientation of the document is determined.

4. The document processing apparatus according to claim 3, wherein:

the processor is further configured to determine, according to the descending order of the text line confidences, the combination confidence for each of the at least some of the text lines, determine, based on the determined combination confidences, a current confidence with respect to each candidate direction, and determine, in the case that a maximum value among the current confidences complies with a first predetermined condition, the candidate direction corresponding to the current confidence of the maximum value to be the orientation of the input document.

5. The document processing apparatus according to claim 4, wherein:

the processor is further configured to determine, based on the determined combination confidences and the determined optical character recognition confidences, the current confidence with respect to each candidate direction.

6. The document processing apparatus according to claim 1, wherein:

the processor is further configured to calculate, for each of the text lines, the possibility of being a line of characters in the document as a text line confidence; and determine, according to a descending order of the text line confidences, a text line language confidence with respect to each candidate language for each of the text lines one by one, determine, based on the determined text line language confidences, a current language confidence with respect to each candidate language, and determine, in the case that a maximum value among the current language confidences complies with a second predetermined condition, the candidate language corresponding to the language confidence of the maximum value as the language of the input document.

7. The document processing apparatus according to claim 1, wherein:

the processor is further configured to resize the input document and provide the resized document for extracting the text lines.

8. The document processing apparatus according to claim 1, wherein:

the processor is further configured to convert the input document into a binarized image document, and provide the binarized image document for extracting the text lines.

9. A scanner, comprising the document processing apparatus according to claim 1 for determining the orientation of the input document.

10. A document processing method, comprising:

extracting at least one text line from an input document;

determining, by performing a graphic feature recognition process, whether or not an optical character recognition process is necessary for a language of the input document;

determining, by performing the optical character recognition process, an optical character recognition confidence with respect to each candidate direction for each of at least some of the text lines, in the case that it is determined that the optical character recognition process is not necessary for the language of the input document;

determining, by performing the graphic feature recognition processing, a graphic feature recognition confidence with respect to each candidate direction for each text lines; and determining, based on at least one of the determined graphic feature recognition confidences and the determined optical character recognition confidences, a combination confidence with respect to each candidate direction for each of the at least some of the text lines, and determining, based on the combination confidences, an orientation of the input document.

11. The document processing method according to claim 10, wherein in the language classification step, it is determined that the optical character recognition process is necessary for the language of the input document, in the case that the language of the input document is determined to be Chinese, Japanese, Korean or a language in Latin alphabet.

12. The document processing method according to claim 10, wherein in the text line extraction step, for each of the text lines, the possibility of being a line of the characters in the document is further calculated as text line confidences; and in the optical character recognition step, the optical character recognition confidence for each text line is further determined one by one according to a descending order of the text line confidences, until the orientation of the document is determined by the determination step.

13. The document processing method according to claim 12, wherein in the determination step, the combination confidence for each of the at least some of the text line is determined according to the descending order of the text line confidences, a current confidence with respect to each candidate direction is determined based on the determined combination confidences, and in the case that a maximum value among the current confidences meets a first predetermined condition, the candidate direction corresponding to the current confidence of the maximum value is determined to be the orientation of the input document.

14. The document processing method according to claim 13, wherein
in the determination step, the current confidence with respect to each candidate direction is determined based on the determined combination confidences and the determined optical character recognition confidences.

15. The document processing method according to claim 10, wherein
in the text line extraction step, for each of the text lines, the possibility of being a line of the characters in the document is further calculated as text line confidences; and
in the language classification step, a text line language confidence with respect to each candidate language for each of the text lines is determined one by one according to a descending order of the text line confidences, a current language confidence with respect to each candidate language is determined based on the determined text line language confidences, and in the case that a maximum value among the current language confidences complies with a second predetermined condition, the candidate language corresponding to the language confidence of the maximum value is determined as the language of the input document.

16. The document processing method according to claim 10, further comprising:
a resizing step for resizing the input document and applying the resized document for extracting the text lines in the text line extraction step.

17. The document processing method according to claim 10, further comprising:
a binarization step for converting the input document into a binarized image document, wherein the language of the binarized image document is used for extracting the text lines in the text line extraction step.

18. A program stored on a non-transitory computer readable medium causing a computer device to execute the document processing method according to claim 10, for determining an orientation of the input document.

19. A non-transitory computer readable storage medium on which a program executable by a computer is stored, and when being executed, the program causes the computer device to execute the document processing method according to claim 10.

* * * * *